United States Patent
Anderson

(10) Patent No.: US 7,705,110 B2
(45) Date of Patent: Apr. 27, 2010

(54) NON-GELLED CURABLE COMPOSITIONS CONTAINING IMIDE FUNCTIONAL COMPOUNDS

(75) Inventor: Linda K. Anderson, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1366 days.

(21) Appl. No.: 11/005,375

(22) Filed: Dec. 6, 2004

(65) Prior Publication Data

US 2006/0122075 A1 Jun. 8, 2006

(51) Int. Cl.
*C08G 73/10* (2006.01)
*C08G 73/12* (2006.01)
*C08G 69/48* (2006.01)
*C08F 20/06* (2006.01)

(52) U.S. Cl. .................. 528/322; 528/49; 528/170; 525/327.4; 525/327.6; 525/421

(58) Field of Classification Search ............. 525/327.4, 525/327.6, 421; 528/49, 170, 310, 322
See application file for complete search history.

(56) References Cited

U.S. PATENT DOCUMENTS

| | | | | |
|---|---|---|---|---|
| 3,520,852 A * | 7/1970 | Conboy et al. | ............. | 525/380 |
| 3,546,243 A | 12/1970 | Coupland | | |
| 3,832,329 A * | 8/1974 | Geering et al | ............... | 528/191 |
| 3,897,377 A | 7/1975 | Broecker et al. | ............. | 260/18 |
| 3,925,181 A | 12/1975 | McGinniss | ................. | 204/181 |
| 4,037,018 A | 7/1977 | McGinniss | ................. | 428/418 |
| 4,038,251 A * | 7/1977 | Forgo et al. | ................. | 528/170 |
| 4,094,843 A | 6/1978 | McGinniss | ............. | 260/29.2 N |
| 4,130,469 A | 12/1978 | McGinniss | ................. | 204/159.16 |
| 4,134,865 A * | 1/1979 | Tominaga | ................... | 523/415 |
| 4,170,701 A * | 10/1979 | Rottmaier et al. | ............. | 528/49 |
| 4,302,572 A | 11/1981 | Locatelli et al. | ............... | 528/73 |
| 4,388,451 A * | 6/1983 | Culbertson et al. | .......... | 526/271 |
| 4,393,188 A | 7/1983 | Takahashi et al. | ............. | 528/88 |
| 4,507,412 A * | 3/1985 | Hickner et al. | ............. | 523/454 |
| 4,713,191 A * | 12/1987 | Nalesnik | ..................... | 508/291 |
| 4,923,959 A | 5/1990 | Kan et al. | ................... | 528/322 |
| 5,068,463 A * | 11/1991 | Walter | ........................ | 568/726 |
| 5,098,982 A * | 3/1992 | Long, II | ....................... | 521/56 |
| 5,104,962 A | 4/1992 | Yamaya et al. | .............. | 528/170 |
| 5,211,835 A * | 5/1993 | Forester | ................. | 208/48 AA |
| 5,252,689 A * | 10/1993 | Lucas et al. | ................. | 526/227 |
| 5,945,503 A | 8/1999 | Takuma et al. | ............. | 528/170 |
| 7,294,683 B2 * | 11/2007 | Olson et al. | ................. | 528/310 |
| 7,307,140 B2 * | 12/2007 | Danielmeier et al. | ........ | 528/310 |
| 2003/0096909 A1 * | 5/2003 | Bernard et al. | .............. | 525/123 |

* cited by examiner

*Primary Examiner*—Vasu Jagannathan
*Assistant Examiner*—Benjamin J Gillespie
(74) *Attorney, Agent, or Firm*—Deborah M. Altman; Diane R. Meyers

(57) ABSTRACT

The present invention is directed to a non-gelled, curable composition including at least one compound having a plurality of imide functional groups. The compound in particular contains a reaction product of
  a) at least one hydroxyalkylamino functional succinimide;
  b) at least one polyisocyanate; and optionally
  c) at least one capping agent. The composition is suitable for use in coatings and castings.

20 Claims, No Drawings

NON-GELLED CURABLE COMPOSITIONS CONTAINING IMIDE FUNCTIONAL COMPOUNDS

CROSS-REFERENCE TO RELATED APPLICATIONS

This application is related to U.S. patent application Ser. No. 11/005,374, filed concurrently herewith.

FIELD OF THE INVENTION

The present invention relates to imide functional compounds used in non-gelled, curable compositions, suitable for use as coatings and castings.

BACKGROUND OF THE INVENTION

In microelectronic circuit packages, circuits and units are prepared in packaging levels of increasing scale. Generally, the smallest scale packaging levels are semiconductor chips housing multiple microcircuits and/or other components. Such chips are usually made from ceramics, silicon, and the like. Intermediate package levels (i.e., "chip carriers") comprising multi-layer substrates may have attached thereto a plurality of small-scale chips housing many microelectronic circuits. Likewise, these intermediate package levels themselves can be attached to larger scale circuit cards, motherboards, and the like. The intermediate package levels serve several purposes in the overall circuit assembly including structural support, transitional integration of the smaller scale microcircuits and circuits to larger scale boards, and the dissipation of heat from the circuit assembly. Substrates used in conventional intermediate package levels have included a variety of materials, for example, ceramic, fiberglass reinforced polyepoxides, and polyimides.

Dielectric materials used as coatings on the substrates must meet several requirements, including conformality, flame resistance, and compatible thermal expansion properties. Conventional dielectric materials include, for example, polyimides, polyepoxides, phenolics, and fluorocarbons. A common method of applying conformal coatings is by vapor deposition. Electrophoretic deposition has also been explored; however, polyimide resins such as bismaleimide resins, while desired for their superior dielectric and thermal stability properties, are intractable in most solvents, let alone aqueous dispersions, making electrophoretic deposition of such resins virtually impossible. Reactivity of the resins with amines increases the difficulty of formulation in both solvent based and aqueous dispersed coatings.

Accordingly, it would be desirable to provide a composition that provides the dielectric and thermal stability properties necessary for electronic circuit applications, while allowing for convenient electrophoretic deposition thereof.

SUMMARY OF THE INVENTION

The present invention is directed to a non-gelled, curable composition comprising at least one compound having a plurality of imide functional groups. The compound comprises a reaction product of a) at least one hydroxyalkylamino functional succinimide;

b) at least one polyisocyanate; and optionally c) at least one capping agent. The composition is suitable for use in coatings and castings.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

By "polymer" is meant a polymer including homopolymers and copolymers, and oligomers. Unless stated otherwise, molecular weights are number average molecular weights for polymeric materials indicated as "$M_n$," and obtained by gel permeation chromatography using a polystyrene standard in an art-recognized manner. By "composite material" is meant a combination of two or more differing materials.

The compositions of the present invention are curable compositions. As used herein, the terms "curable" and "substantially cured" as used in connection with a curable composition means that any crosslinkable components of the composition are at least partially crosslinked after a curing process (e.g., heating). In certain embodiments of the present invention, the crosslink density (degree of crosslinking) of the crosslinkable components ranges from 5% to 100% of complete crosslinking. One skilled in the art will understand that the presence and degree of crosslinking, i.e., the crosslink density, can be determined by a variety of methods.

The compositions of the present invention are additionally non-gelled. By "non-gelled" is meant that prior to a curing process, the composition is substantially free from crosslinking, and the composition has a measurable intrinsic viscosity when dissolved in a suitable solvent, as determined, for example, in accordance with ASTM-D1795 or ASTM-D4243. In contrast, a gelled composition, having an essentially infinite molecular weight, would have an intrinsic viscosity too high to measure.

The compositions of the present invention are suitable for use as molding compounds, film-forming compositions (e.g., coating compositions), fiberglass sizing, and the like. They are often used as film-forming compositions. In particular, the compositions of the present invention are suitable for use as coatings in electronic applications, such as for chip scale packages, printed circuit boards, and the like, due to their superior dielectric and thermal stability properties.

The compositions of the present invention comprise at least one compound having a plurality of imide functional groups. The compound comprises in particular a reaction product of
 a) at least one hydroxyalkylamino functional succinimide;
 b) at least one polyisocyanate; and optionally
 c) at least one capping agent.

The hydroxyalkylamino functional succinimide often comprises a reaction product of at least one secondary hydroxyalkyl monoamine and at least one maleimide. Primary hydroxyalkylamines may be used in place of or in combination with the secondary hydroxyalkyl monoamine, provided that the primary hydroxyalkylamines are used in amounts so that the resulting reaction product remains non-gelled.

The secondary hydroxyalkyl monoamine used to prepare the hydroxyalkylamino functional succinimide may be aliphatic or aromatic. In an embodiment of the present invention, the secondary hydroxyalkyl monoamine comprises an aliphatic secondary hydroxyalkyl monoamine. The secondary hydroxyalkyl monoamine may have one or more hydroxyl groups, and may be selected from diethanolamine, methylethanol amine, diisopropanolamine, bis(3-hydroxypropyl)amine, hydroxyethylpiperazine, and the like. Mixtures of secondary hydroxyalkyl monoamines are also suitable. The amount of secondary hydroxyalkylamine used to prepare the hydroxyalkylamino functional succinimide is usually about 40 to 100 percent by equivalent, often 60 to 100 percent by equivalent, based on the total maleimide equivalents used to prepare the succinimide.

The maleimide used to prepare the hydroxyalkylamino functional succinimide of the present invention may include any N-substituted maleimide, such as N-phenylmaleimide. The maleimide may be derived from aniline and/or aniline-formaldehyde condensation polymers. In certain embodiments the maleimide comprises a bismaleimide, which may be derived from, for example, 1,1'-(methylenedi-4,1-phenylene)bismaleimide such as BMI-1000, polyphenylmethane maleimide, such as BMI-200, m-phenylenebismaleimide, such as BMI-3000, bisphenol A diphenyl ether bismaleimide, such as BMI-4000, and 3,3'-dimethyl-5,5'-diethyl-4,4'-diphenylmethane bismaleimide, all available from Miki Sangyo (USA), Inc.

In the preparation of the reaction product of the present invention, the tertiary hydroxyalkylamino functional succinimide reactant a) is used in an amount of 5 to 80, often 10 to 60 percent by equivalent, based on the total equivalents of isocyanate groups in the reaction mixture.

The polyisocyanate used to prepare the reaction product may be selected from one or more polyisocyanates such as any of those well known in the art. Suitable examples include diisocyanates and triisocyanates including biurets and isocyanurates. Biurets of any suitable diisocyanate including 1,4-tetramethylene diisocyanate and 1,6-hexamethylene diisocyanate may be used as reactant a) in the preparation of the reaction product of the present invention. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmeta-xylylene diisocyanate. The diisocyanates themselves may also be used as reactant b) in the preparation of the reaction product of the present invention.

Trifunctional isocyanates may also be used as reactant b), for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the trade name CYTHANE 3160 by CYTEC Industries, and DESMODUR N 3300, which is the isocyanurate of hexamethylene diisocyanate, available from Bayer Corporation. Specifically used polyisocyanates are cyclic isocyanates, particularly, isocyanurates of diisocyanates such as hexamethylene diisocyanate and isophorone diisocyanate.

The polyisocyanate used as reactant b) may also be one of those disclosed above, chain extended with one or more polyamines and/or polyols using suitable materials and techniques known to those skilled in the art.

Any suitable aliphatic, cycloaliphatic, or aromatic alkyl monoalcohol or phenolic compound known to those skilled in the art can be used as a capping agent for the polyisocyanate. Examples of suitable capping agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

In a particular embodiment of the invention, the capping agent may be selected from methylethyl ketoxime, 1,2-butanediol, benzyl alcohol, epsilon-caprolactam, and mixtures thereof.

In the preparation of the reaction product of the present invention, when the capping agent c) is used, it is used in an amount of 20 to 95, often 40 to 90 percent by equivalent, based on the total equivalents of isocyanate groups in the reaction mixture.

The hydroxyalkylamino functional succinimide used to prepare the composition of the present invention may be water-dispersible. By "water-dispersible" is meant able to be solubilized, dispersed or emulsified in water.

The imide-functional group-containing compound used in the composition of the present invention may be prepared by reacting components a), b), and c) together simultaneously. Alternatively, the compound may be prepared by reacting components a) and b) together initially to form a first product, and when a capping agent c) is used, the initial reaction of a) and b) is followed by reaction of the first product with component c). Such preparation methods are demonstrated in non-limiting illustrative examples below.

The imide-functional group-containing compound used in the composition of the present invention may be present in amounts up to 100 percent by weight. When the composition includes other resinous components as described below, the imide-functional group-containing compound is usually present at 15 to 70 percent by weight, often 20 to 50 percent by weight, based on the total weight of resin solids of the composition.

In certain non-limiting embodiments of the present invention, the composition further comprises at least one crosslinkable film-forming polymer. The polymer may comprise in these embodiments appropriate functional groups, including, for example, active hydrogen-containing groups. Such active hydrogen-containing groups may be selected from thiol, hydroxyl, amine, and other groups that are reactive with isocyanates, including mixtures thereof.

The polymer may be a water-dispersible film-forming polymer. The water-dispersible polymer is often ionic in nature; that is, the polymer can contain anionic functional groups to impart a negative charge or cationic functional groups to impart a positive charge. Most often, the polymer contains cationic salt groups, usually cationic amine salt groups.

Non-limiting examples of film-forming resins suitable for use as the polymer in the composition of the present invention, in particular in anionic coating compositions, include base-solubilized, carboxylic acid group-containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable resin comprises an alkyd-aminoplast vehicle, i.e., a vehicle containing an alkyd resin and an amine-aldehyde resin. Another suitable anionic resin composition comprises mixed esters of a resinous polyol. These compositions are described in detail in U.S. Pat. No. 3,749,657 at col. 9, lines 1 to 75 and col. 10, lines 1 to 13. Other acid functional polymers also can be used such as phosphatized polyepoxide or phosphatized acrylic polymers as are well known to those skilled in the art. Additionally, suitable for use as the polymer are those resins comprising one or more pendent carbamate functional groups, for example, those described in U.S. Pat. No. 6,165,338.

Other thermosetting polymers include, inter alia, radiation curable binders. "Radiation curable" and like terms as used herein refer to a class of coatings that can be cured by being subjected to ionizing radiation (e.g., electron beams) or actinic light (e.g., UV light). For example, electron beam curable acrylic coating compositions such as those comprising a urethane acrylate may be used as a resinous binder in the composition of the present invention.

In particular embodiments of the present invention, the polymer is a cationic, active hydrogen-containing ionic electrodepositable resin capable of deposition on a cathode. Non-limiting examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Also, compositions as described in U.S. Pat. No. 4,134,866 and DE-OS No. 2,707,405 can be used in the composition of the present invention as the polymer.

Besides the epoxy-amine reaction products discussed immediately above, the polymer can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins include those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, cationic compositions prepared from Mannich bases such as described in U.S. Pat. No. 4,134,932 can be used.

In one embodiment of the present invention, the polymer can comprise one or more positively charged resins which contain primary and/or secondary amine groups. Such resins are described in U.S. Pat. Nos. 3,663,389; 3,947,339; and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when a polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

In certain non-limiting embodiments of the present invention, the polyepoxide may be derived from a polyglycidyl ether of a polyphenol, chain-extended with a halogenated 4,4'-isopropylidenediphenol. Suitable examples include tetrachloro-4,4'-isopropylidenediphenol (tetrachlorobisphenol A) and tetrabromo-4,4'-isopropylidenediphenol (tetrabromobisphenol A), as disclosed in U.S. Pat. No. 6,713,587. Such polymers may improve flame retardance of the composition, which is particularly advantageous in electronic applications. These polymers may be rendered cationic in a manner similar to those described above for other polyepoxides.

Mixtures of the above-described ionic resins also can be used advantageously. In one embodiment of the present invention, the polymer has cationic salt groups and comprises a polyepoxide-based polymer having primary, secondary and/or tertiary amine groups (such as those described above) and an acrylic polymer having hydroxyl and/or amine functional groups.

As previously discussed, in particular embodiments of the present invention, the polymer has cationic salt groups. In these instances, such cationic salt groups typically are formed by solubilizing the resin with an inorganic or organic acid such as those conventionally used in electrodepositable compositions. Suitable examples of solubilizing acids include, but are not limited to, sulfamic, acetic, lactic, alkanesulfonic such as methanesulfonic, and formic acids. Sulfamic and lactic acids are most commonly employed.

When the polymers described above are used, they can be present in amounts ranging from 10 to 90 percent by weight, usually 30 to 80 percent by weight, based on the total weight of resin solids in the composition.

The composition of the present invention may further comprise an additional curing agent different from the reaction product of the present invention, reactive with the active hydrogens of the polymers described immediately above. Note that the terms "curing agent" and "crosslinking agent" are used interchangeably. Blocked organic polyisocyanate and aminoplast curing agents are suitable for use in the present invention, although blocked isocyanates typically are employed for cathodic electrodeposition.

Aminoplast resins are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Most often, these methylol groups are etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from CYTEC Industries, Inc. under the trademark CYMEL and from Monsanto Chemical Co. under the trademark RESIMENE.

The aminoplast curing agents, when present, typically are utilized in conjunction with an active hydrogen-containing anionic polymer and are present in amounts ranging from about 5 to 50 percent by weight, often from 5 to 25 percent by weight, the percentages based on the total weight of the resin solids in the composition.

The curing agents commonly employed in cathodic electrodeposition compositions are blocked polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein.

Suitable polyisocyanates include those disclosed above for the preparation of the reaction product of the present invention.

The polyisocyanate curing agents typically are utilized in conjunction, with the active hydrogen-containing cationic electrodepositable polymer in amounts ranging from ranging from 5 to 50 percent by weight, usually 5 to 25 percent by weight, based on total weight of resin solids in the composition.

Also suitable are beta-hydroxy urethane curing agents such as those described in U.S. Pat. Nos. 4,435,559 and 5,250,164. Such beta-hydroxy urethanes are formed from an isocyanate compound, for example, any of those described immediately above, a 1,2-polyol and/or a conventional blocking such as monoalcohol. Also suitable are the secondary amine blocked aliphatic and cycloaliphatic isocyanates described in U.S. Pat. Nos. 4,495,229 and 5,188,716.

The composition of the present invention may further contain a variety of additives including coalescing solvents, surfactants, rheology modifiers, pigments, thixotropes, plasticizers, extenders, stabilizers, and antioxidants, as are commonly used in the art.

In an embodiment of the present invention, when the composition is used as a dielectric coating on a circuit substrate, the composition can further comprise a rheology modifier as mentioned above, which can assist in the deposition of a smooth and uniform thickness of the dielectric coating on the surface of the hole or via walls as well as the edges, including edges at the via openings (without obstructing the holes), on a circuit substrate. Any of a variety of the rheology modifiers well-known in the coatings art can be employed for this purpose.

One suitable rheology modifier comprises a cationic microgel dispersion prepared by dispersing in aqueous medium a mixture of a cationic polyepoxide-amine reaction product which contains amine groups, typically primary amine groups, secondary amine groups and mixtures thereof, and a polyepoxide crosslinking agent, and heating the mixture to a temperature sufficient to crosslink the mixture, thus forming a cationic microgel dispersion. Such cationic microgel dispersions and their preparation are described in detail in U.S. Pat. No. 5,096,556 at column 1, line 66 to column 5, line 13, incorporated by reference herein. Other suitable rheology modifiers include the cationic microgel dispersion having a shell-core morphology described in detail in EP 0 272 500 B1. This microgel is prepared by emulsification in aqueous medium of a cationic film-forming resin and a thermosetting crosslinking agent, and heating the resultant emulsion to a temperature sufficient to crosslink the two components.

The cationic microgel is present in the composition of the present invention in an amount sufficient to effect adequate rheology control and edge coverage, but insufficient to adversely affect flow of the composition upon application or surface roughness of the cured coating. For example, the cationic microgels described immediately above can be present in the resinous phase of the composition in an amount ranging from 0.1 to 30 weight percent, typically from 1 to 20 weight percent based on the weight of total resin solids present in the resinous phase.

When the composition described above is electrophoretically deposited and cured to form a cured film (as described in detail below), the cured film can have a dielectric constant of no more than 3.50, or no more than 3.30, or of no more than 3.00, or no more than 2.80. Also, the cured film has a dielectric loss factor of less than or equal to 0.02, usually less than or equal to 0.015, and can be less than or equal to 0.01.

A dielectric material is a non-conducting substance or insulator. The "dielectric constant" is an index or measure of the ability of a dielectric material to store an electric charge. The dielectric constant is directly proportional to the capacitance of a material, which means that the capacitance is reduced if the dielectric constant of a material is reduced. A low dielectric material is desired for high frequency, high speed digital where the capacitances of substrates and coatings are critical to the reliable functioning of circuits. For example, present computer operations are limited by coupling capacitance between circuit paths and integrated circuits on multi-layer assemblies since computing speed between integrated circuits is reduced by this capacitance and the power required to operate is increased. See Thompson, Larry F., et al., *Polymers for Microelectronics*, presented at the 203$^{rd}$ National Meeting of American Chemical Society, Apr. 5-10, 1992.

The "dielectric loss factor" is the power dissipated by a dielectric material as the friction of its molecules opposes the molecular motion produced by an alternating electric field. See I. Gilleo, Ken, *Handbook of Flexible Circuits*, at p. 242, Van Nostrand Reinhold, New York (1991). See also, James J. Licari and Laura A. Hughes, *Handbook of Polymer Coatings for Electronics*, pp. 114-18, 2$^{nd}$ ed., Noyes Publication (1990) for a detailed discussion of dielectric materials and dielectric constant.

The dielectric constant of the cured composition can be measured by any of the methods used in the art. For purposes of the present invention, one suitable method uses electrochemical impedance spectroscopy as follows.

The coating sample is prepared by application of the composition to a steel substrate and subsequent curing to provide a cured dielectric coating having a film thickness of 0.85 mil (20.83 microns). A 32 square centimeter free film of the cured dielectric coating is placed in the electrochemical cell with 150 milliliters of electrolyte solution (1 M NaCl) and allowed to equilibrate for one hour. An AC potential of 100 mV is applied to the sample and the impedance is measured from 1.5 megahertz to 1 hertz frequency range. The method employs a platinum-on-niobium expanded mesh counter electrode and a single junction silver/silver chloride reference electrode. The dielectric constant of the cured coating MAY BE determined by calculating the capacitance at 1 megahertz, 1 kilohertz, and 63 hertz, and solving the following equation for E.

$$C = E_o E A / d$$

where C is the measured capacitance at discrete frequency (in Farads); $E_o$ is the permitivity of free space ($8.854187817^{12}$); A is the sample area (32 square centimeters); d is the coating thickness; and E is the dielectric constant. It should be noted the values for dielectric constant as used in the specification and in the claims is the dielectric constant determined as described above at a frequency of 1 megahertz. Values for the dielectric loss factor as used in the specification and in the claims represent the difference between the dielectric constant measured at a frequency of 1 megahertz as described above, and the dielectric constant for the same material measured at a frequency of 1.1 megahertz.

Any of the previously described electrodepositable cationic compositions can be electrophoretically applied to an electroconductive core of a multi-layer circuit assembly. The applied voltage for electrodeposition may be varied and can be, for example, as low as 1 volt to as high as several thousand volts, but typically between 50 and 500 volts. The current density is usually between 0.5 ampere and 5 amperes per square foot (0.5 to 5 milliamperes per square centimeter) and tends to decrease during electrodeposition indicating the formation of an insulating conformal film on all exposed surfaces of the core. As used herein and in the specification and in the claims, by "conformal" film or coating is meant a film or coating having a substantially uniform thickness which conforms to the substrate topography, including the surfaces within (but not occluding) any holes that may be present. After the coating has been applied by electrodeposition, it is cured, typically thermally cured, at elevated temperatures ranging from 90° to 300° C. for a period of 1 to 40 minutes to form a conformal dielectric coating over all exposed surfaces of the core.

The dielectric coating is of uniform thickness and often is no more than 50 microns, or no more than 25 microns, or no more than 20 microns. A lower film thickness is desirable for a variety of reasons. For example, a dielectric coating having a low film thickness allows for smaller scale circuitry. Also, a coating having a low dielectric constant (as discussed above) allows for a dielectric coating having a lower film thickness and also minimizes capacitive coupling between adjacent signal traces.

Those skilled in the art would recognize that prior to the electrophoretic application of the dielectric coating, the core surface may be pretreated or otherwise prepared for the application of the dielectric. For example, cleaning, rinsing, and/or treatment with an adhesion promoter prior to application of the dielectric may be appropriate.

Moreover, it should be understood, that any of the aforementioned compositions can be applied by a variety of application techniques well known in the art other than electrodeposition, for example, by roll-coating, immersion, or spray application techniques. In such instances, it may be desirable to prepare the composition at higher resin solids content. Also, for such applications, the polymer may or may not include solubilizing or neutralizing acids to form cationic salt groups.

Suitable substrates to be used as the core are any electrically conductive materials. For example, suitable metals include copper foil, iron-nickel alloys, and combinations thereof. A preferred iron-nickel alloy is Invar, (trademark owned by Imphy S. A., 168 Rue de Rivoli, Paris, France) comprising approximately 64 weight percent iron and 36 weight percent nickel. This alloy has a low coefficient of thermal expansion, comparable to that of silicon materials used to prepare chips. This property is desirable in order to prevent failure of adhesive joints between successively larger or smaller scale layers of a chip scale package, due to thermal cycling during normal use. When a nickel-iron alloy is used as the electrically conductive core, a layer of copper metal is preferably applied to all surfaces of the electrically conductive core to ensure optimum conductivity. The layer of copper metal may be applied by conventional means, such as electroplating or metal vapor deposition. The layer of copper typically has a thickness of from 1 to 8 microns. The substrate may be a solid substrate, such as a sheet, or may one or more holes, for example, one or more vias or slots in the substrate.

In a particular embodiment, suitable substrates include perforate electrically conductive cores having a thickness of about 15 to 250 microns, such as 25 to 100 microns. By "perforate electrically conductive core" is meant an electrically conductive mesh sheet having a plurality of holes spaced at regular intervals. Typically the holes are of uniform size and shape. When the holes are circular, which is typical, the diameter of the holes is about 8 mil (203.2 microns). The holes may be larger or smaller as necessary, with the proviso that a hole is large enough to accommodate all the layers applied without becoming obstructed. The spacing of the holes is about 20 mils (508 microns) center-to-center, but again may be larger or smaller as necessary. Via density may range from 500 to 10,000 holes/square inch (75 to 1550 holes/square centimeter), preferably about 2500 holes/square inch (387.5 holes/square centimeter).

The film-forming composition of the present invention, serving as a dielectric coating, may be applied to all exposed surfaces of the electrically conductive core to form a conformal coating. As a conformal coating, the dielectric is of substantially uniform thickness, typically about 5 to 50 microns on all exposed surfaces of the metal core. After application of the dielectric coating, holes or vias may be formed in the surface of the dielectric coating in a predetermined pattern to expose sections of the core. Such holes may be formed by laser ablation, mechanical drilling and chemical or plasma etching techniques.

Metallization can be performed after the via-forming step by applying a layer of metal to all surfaces, allowing for the formation of metallized vias in the core. Suitable metals include copper or any metal or alloy with sufficient conductive properties. The metal can be applied, for example, by electroplating, sputtering, or any other suitable method known in the art to provide a uniform metal layer. The thickness of this metal layer can range from 1 to 50 microns, typically from 5 to 25 microns.

To enhance the adhesion of the metal layer to the dielectric coating, prior to the metallization step all surfaces can be treated with ion beam, electron beam, corona discharge or plasma bombardment followed by application of an adhesion promoter layer to all surfaces. The adhesion promoter layer can range from 50 to 5000 Ångstroms thick and is typically a metal or metal oxide selected from chromium, titanium, nickel, cobalt, cesium, iron, aluminum, copper, gold, tungsten, and zinc, and alloys and oxides thereof.

After metallization, a resinous photosensitive layer (i.e. "photoresist" or "resist") is applied to the metal layer. Optionally, prior to application of the photoresist, the metallized substrate can be cleaned and/or pretreated; e.g., treated with an acid etchant to remove oxidized metal. The resinous photosensitive layer can be a positive or negative photoresist. The photoresist layer can have a thickness ranging from 1 to 50 microns, typically 5 to 25 microns, and can be applied by any method known to those skilled in the photolithographic processing art. Additive or subtractive processing methods may be used to create the desired circuit patterns.

Suitable positive-acting photosensitive resins include any of those known to practitioners skilled in the art. Examples include dinitrobenzyl functional polymers such as those disclosed in U.S. Pat. No. 5,600,035, columns 3-15. Such resins have a high degree of photosensitivity. In one embodiment, the resinous photosensitive layer is a composition comprising a dinitrobenzyl functional polymer, typically applied by spraying.

The resinous photosensitive layer may comprise an electrodepositable composition comprising a dinitrobenzyl functional polyurethane and an epoxy-amine polymer such as that described in Examples 3-6 of U.S. Pat. No. 5,600,035.

Negative-acting photoresists include liquid or dry-film type compositions. Any of the previously described liquid compositions may be applied by spray, roll-coating, spin coating, curtain coating, screen coating, immersion coating, or electrodeposition application techniques. Preferably, liquid photoresists are applied by electrodeposition, more preferably cationic electrodeposition. Electrodepositable photoresist compositions comprise an ionic, polymeric material which may be cationic or anionic, and may be selected from polyesters, polyurethanes, acrylics, and polyepoxides. Examples of photoresists applied by anionic electrodeposition are shown in U.S. Pat. No. 3,738,835. Photoresists applied by cationic electrodeposition are described in U.S. Pat. No. 4,592,816. Examples of dry-film photoresists include those disclosed in U.S. Pat. Nos. 3,469,982, 4,378,264, and 4,343,885. Dry-film photoresists are typically laminated onto the surface such as by application of hot rollers.

Note that after application of the photosensitive layer, the multi-layer substrate may be packaged at this point allowing for transport and processing of any subsequent steps at a remote location.

Alternatively, after the photosensitive layer is applied, a photo-mask having a desired pattern may be placed over the photosensitive layer and the layered substrate exposed to a sufficient level of a suitable radiation source, typically an actinic radiation source. As used herein, the term "sufficient level of radiation" refers to that level of radiation which polymerizes the monomers in the radiation-exposed areas in the case of negative acting resists, or which depolymerizes the polymer or renders the polymer more soluble in the case of positive acting resists. This results in a solubility differential between the radiation-exposed and radiation-shielded areas.

The photo-mask may be removed after exposure to the radiation source and the layered substrate developed using conventional developing solutions to remove more soluble portions of the photosensitive layer, and uncover selected areas of the underlying metal layer. The metal uncovered may then be etched using metal etchants which convert the metal to water soluble metal complexes. The soluble complexes may be removed by water spraying.

The photosensitive layer protects the underlying substrate during the etching step. The remaining photosensitive layer, which is impervious to the etchants, may then be removed by a chemical stripping process to provide a circuit pattern connected by the metallized vias.

After preparation of the circuit pattern on the multi-layered substrate, other circuit components may be attached to form a circuit assembly. Additional components include, for example, one or more smaller scale components such as semiconductor chips, interposer layers, larger scale circuit cards or mother boards and active or passive components. Note that interposers used in the preparation of the circuit assembly may be prepared using appropriate steps of the process of the present invention. Components may be attached using conventional adhesives, surface mount techniques, wire bonding or flip chip techniques. High via density in the multi-layer circuit assembly prepared in accordance with the present invention allows for more electrical interconnects from highly functional chips to the packages in the assembly.

The following examples are intended to illustrate various embodiments of the invention, and should not be construed as limiting the invention in any way. Unless otherwise indicated, all parts are by weight (grams).

Example 1

This example describes the preparation of an hydroxyalkylamino functional succinimide. The succinimide was prepared as described below from the following ingredients:

| Ingredients | Parts by weight (in grams) |
| --- | --- |
| BMI 1000[1] | 200.0 |
| N-Methyl-2-pyrrolidone | 200.0 |
| Methylethanolamine | 84.0 |
| N-Methyl-2-pyrrolidone | 20.0 |
| N-Methyl-2-pyrrolidone | 14.0 |

[1]4,4'-diphenylmethane maleimide, available from Miki Sangyo (USA), Inc., Parsippany, NJ.

The BMI-1000 and first amount of N-methyl-2-pyrrolidone were placed in a 1-liter flask under nitrogen. The mixture was heated to 80° C. until the BMI-1000 appeared to be dissolved. The solution was cooled to 36° C., then the methylethanolamine was added over 35 minutes, at which time the reaction temperature had risen to 76° C. The two quantities of N-methyl-2-pyrrolidone were added as rinses. The solution was held at 70° C. for 30 minutes, yielding a deep red solution at 60.4% solids.

Example 2

This example describes the preparation of a urethane-succinimide for use in a coating composition. The urethane-succinimide was prepared as described below from the following ingredients:

| Ingredients | Parts by weight (in grams) |
| --- | --- |
| DESMODUR ® N 3300[1] | 750.8 |
| Methylisobutyl ketone | 80.0 |
| Dibutyltin dilaurate | 0.53 |
| Benzyl alcohol | 126.2 |
| Methylisobutyl ketone | 2.0 |
| Succinimide of Example 1 | 338.3 |
| 1,2-Butanediol | 164.4 |
| Methylisobutyl ketone | 40.0 |
| Methylisobutyl ketone | 361.7 |

[1]Polyfunctional hexamethylene diisocyanate available from Bayer Corp.

The DESMODUR N 3300, first amount of methylisobutyl ketone and dibutyltin dilaurate were placed in a two-liter flask and warmed to 39° C. under nitrogen. The benzyl alcohol was added dropwise over 45 minutes then rinsed with the second amount of methylisobutyl ketone, during which time the reaction temperature rose to 63° C. When the addition was complete, the reaction was heated to 85° C. and held for 45 minutes. The intermediate reaction product (900 g) was transferred to a 1-liter addition funnel attached to a 3-liter flask containing the succinimide of Example 1, the 1,2-butanediol and the third amount of methylisobutyl ketone. The intermediate reaction product was added to the mixture over 35 minutes, keeping the temperature under 80° with the use of an ice bath. The reaction product was held at 80° C. until isocyanate was consumed as measured by infrared spectroscopy. The final amount of methylisobutyl ketone was added to give a deep red solution at 64.1% solids.

Example 3

This example describes the preparation of a urethane-succinimide for use in a coating composition. The urethane-succinimide was prepared as described below from the following ingredients:

| Ingredients | Parts by weight (in grams) |
| --- | --- |
| DESMODUR N 3300 | 499.7 |
| Methylisobutyl ketone | 166.7 |
| Methylethyl ketoxime | 180.4 |
| Methylisobutyl ketone | 6.5 |
| Dibutyltin dilaurate | 0.41 |
| Methylisobutyl ketone | 3.2 |
| Succinimide of Example 1 | 240.0 |

The DESMODUR N 3300 and first amount of methylisobutyl ketone were placed in a 2-liter flask and heated to 52° C. The methylethyl ketoxime and second amount of methylisobutyl ketone were added dropwise over 50 minutes, at which time the temperature had risen to 64° C. The reaction was held at 90° C. for one hour then cooled to 70° C. The dibutyltin dilaurate was added and rinsed with the third amount of methylisobutyl ketone. The succinimide of Example 1 was added over 35 minutes and the reaction held at 70° C. for 1.5 hours. Additional methylethyl ketoxime (1.4 g) was added to remove residual isocyanate functionality, followed by a rinse of 10.0 g N-methyl-2-pyrrolidone and 2.0 g methylisobutyl ketone. The reaction was held an additional two hours then cooled to yield a solution at 74.1% solids.

Example 4

| Ingredients | Parts by weight (in grams) |
| --- | --- |
| Urethane-succinimide of Example 2 | 454.3 |
| Ethyleneglycol monohexyl ether | 93.7 |
| EPON ® 828[1] | 377.7 |
| Tetrabromobisphenol A | 347.5 |
| TETRONIC ® 150R1[2] | 0.12 |
| Diethanolamine | 24.8 |
| Aminopropyldiethanolamine | 57.3 |
| Ethyleneglycol monohexyl ether | 50.0 |
| EPON 828 | 14.0 |
| Urethane-succinimide of Example 3 | 127.9 |

[1]Diglycidyl ether of bisphenol A having an epoxy equivalent weight of 188, available from Resolution Performance Products.
[2]A surfactant, available from BASF Corporation.

The urethane-succinimide of Example 2, ethyleneglycol monohexyl ether, EPON 828, tetrabromobisphenol A and TETRONIC 150R1 were placed in a 3-liter flask under nitrogen and heated to 80° C. The diethanolamine was added, causing a rise in temperature to 84° C. After holding 30 minutes, the aminopropyldiethanolamine was added and the reaction held for 30 minutes. The solution was then heated to 132° C. and held for 1.5 hours. The second amounts of ethyleneglycol monohexyl ether and EPON 828 were added and the reaction held for 1 hour. The urethane-succinimide of Example 3 was added while cooling to 100° C., then held for 15 minutes. The resulting viscous solution (1315.2 g) was added to a solution of sulfamic acid (21.0 g) and lactic acid (0.82 g, 88%) in deionized water (567.8 g) with vigorous agitation using a high lift blade. The dispersion was stirred 30 minutes, then an additional 852.9 g deionized water was added over 45 minutes. More deionized water was added (500 g total) and the dispersion was distilled under vacuum, removing approximately 590 g distillate. Deionized water (300 g) was added to give a milky dispersion at 36.7% solids.

COATING EXAMPLES

Example A

| Ingredients | Parts by weight (in grams) |
| --- | --- |
| Electrodepositable resin of Example 4 | 448.8 |
| Ethyleneglycol monohexyl ether | 32.9 |
| Deionized water | 1714.9 |

The electrodepositable resin of Example 4 was weighed into a beaker and deionized water was slowly added while hand stirring with a stainless steel spatula. Water additions and stirring continued until the viscosity of the mixture was such as to be easily stirred. This mixture was then transferred to a one gallon plastic container and enough deionized water was added to the bath to enable stirring with an electric mixer equipped with a flat paddle blade. The ethylene glycol monohexyl ether was then added to the bath under agitation. The mixture was allowed to stir for approximately 20 minutes, at which time the remaining deionized water was added. The resulting bath had a pH of 6.02 and a conductivity of 620 microsiemens.

The bath was transferred to a glass beaker for coating. A stainless steel heating/cooling coil served as the counter electrode (anode). The bath was agitated using a magnetic stirrer and the temperature of the bath was held at 75° F. A 4"×12" aluminum panel from Q-panel Lab Products was immersed in the bath and a coat out voltage of 30V was applied for 2 minutes. These conditions produced a film build of approximately 16 microns following a bake in an electric oven of 225° C. for 30 minutes. The baked film showed slight marring following 100 double acetone rubs.

Example B

The urethane-succinimide of Example 2 was applied to a 4"×12" aluminum panel from Q-Panel Lab Products using a #42 wirewound drawdown bar. The coating was baked for 30 minutes at 225° C. in an electric oven, resulting in a film with a thickness of approximately 33 microns. This film exhibited slight marring following 100 double acetone rubs.

Whereas particular embodiments of this invention have been described above for purposes of illustration, it will be evident to those skilled in the art that numerous variations of the details of the present invention may be made without departing from the scope of the invention as defined in the appended claims.

Therefore, what is claimed is:

1. A non-gelled, curable composition comprising at least one compound having a plurality of imide functional groups, wherein the compound comprises a reaction product of
 a) at least one hydroxyalkylamino functional succinimide comprising a reaction product of at least one secondary hydroxyalkyl functional monoamine and at least one maleimide;
 b) at least one polyisocyanate; and optionally
 c) at least one capping agent.

2. The composition of claim 1, wherein the compound is prepared by reacting components a), b), and c) simultaneously.

3. The composition of claim 2, wherein the capping agent is selected from methylethyl ketoxime, 1,2-butanediol, benzyl alcohol, epsilon-caprolactam, and mixtures thereof.

4. The composition of claim 1 wherein the compound is prepared by reacting components a) and b) together initially to form a first product, followed by reaction of the first product with component c).

5. The composition of claim 4, wherein the capping agent is selected from methylethyl ketoxime, 1,2-butanediol, benzyl alcohol, epsilon-caprolactam, and mixtures thereof.

6. The composition of claim 1, wherein the secondary hydroxyalkyl functional monoamine is selected from diethanolamine, methylethanolamine, diisopropanolamine, bis(3-hydroxypropyl)amine, hydroxyethylpiperazine, and mixtures thereof.

7. The composition of claim 1, wherein the maleimide is derived from aniline and/or aniline-formaldehyde condensation polymers.

8. The composition of claim 1, wherein the non-gelled, curable composition comprises a film-forming composition.

9. The composition of claim 8, wherein the film-forming composition further comprises at least one film-forming polymer containing ionic salt groups and active hydrogen-containing groups.

10. The composition of claim 9, wherein the active hydrogen-containing groups are selected from thiol, hydroxyl, amine, and combinations thereof.

11. The composition of claim 9 wherein the film-forming polymer comprises a polyepoxide.

12. The composition of claim 11 wherein the polyepoxide is derived from a polyglycidyl ether of a polyphenol, chain-extended with a halogenated 4,4'-isopropylidenediphenol.

13. The composition of claim 12 wherein the halogenated 4,41-isopropylidenediphenol comprises tetrabromo-4,4'-isopropylidenediphenol.

14. The composition of claim 12, wherein the polyepoxide comprises amine functional groups.

15. The composition of claim 9, wherein the film-forming composition further comprises at least one additional curing agent having functional groups that are reactive with the active hydrogen-containing groups of the film-forming polymer.

16. The composition of claim 15, wherein the curing agent is selected from beta-hydroxy urethane, fully blocked organic polyisocyanate, partially blocked organic polyisocyanate, and aminoplast curing agents, and mixtures thereof.

17. The composition of claim 9, wherein the film-forming polymer comprises amine functional groups.

18. The composition of claim 9, wherein the film-forming polymer comprises cationic salt groups.

19. The composition of claim 9, wherein the composition comprises an electrodepositable composition.

20. A non-gelled, curable composition comprising at least one compound having a plurality of imide functional groups, wherein the compound comprises a reaction product of
 a) at least one hydroxyalkylamino functional succinimide comprising a hydroxyalkylamino group attached to a carbon atom on a succinimide compound, wherein a nitrogen atom present on the hydroxyalkylamino group is attached to a carbon atom of the succinimide compound;
 b) at least one polyisocyanate; and optionally
 c) at least one capping agent.

* * * * *